United States Patent
Bilik et al.

(10) Patent No.: US 10,571,557 B2
(45) Date of Patent: Feb. 25, 2020

(54) TWO-STAGE BEAMFORMING

(71) Applicant: GM Global Technology Operations LLC, Detroit, MI (US)

(72) Inventors: Igal Bilik, Rehovot (IL); Gonen Barkan, Lehavim (IL); Shahar Villeval, Tel Aviv (IL); Shmuel Nedjar, Modiin (IL); Ilya Shapir Poltorak, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 325 days.

(21) Appl. No.: 15/619,933

(22) Filed: Jun. 12, 2017

(65) Prior Publication Data

US 2018/0356506 A1    Dec. 13, 2018

(51) Int. Cl.

| G01S 13/46 | (2006.01) |
|---|---|
| G01S 13/42 | (2006.01) |
| G01S 13/93 | (2006.01) |
| G01S 1/72 | (2006.01) |
| G01S 7/52 | (2006.01) |
| G01S 13/72 | (2006.01) |

(Continued)

(52) U.S. Cl.
CPC ............. G01S 13/46 (2013.01); G01S 1/72 (2013.01); G01S 7/52095 (2013.01);
(Continued)

(58) Field of Classification Search
CPC ........ G01S 13/46; G01S 13/931; G01S 13/42; G01S 1/72; G01S 13/72; G01S 15/8927;
(Continued)

(56) References Cited

U.S. PATENT DOCUMENTS

| 7,576,682 B1* | 8/2009 | Yu .................. G01S 7/2813 342/147 |
|---|---|---|
| 10,193,733 B2* | 1/2019 | Maltsev ............ H04W 72/0453 |
| 2015/0200455 A1* | 7/2015 | Venkateswaran ...... H01Q 1/246 342/372 |

OTHER PUBLICATIONS

Ersoy et al., "Fahrwerkhandbuch", ATZ/MTZ-Fachbuch, Springer Vieweg, Wiesbaden, 2017, pp. 1-56.
(Continued)

*Primary Examiner* — Frank J McGue
(74) *Attorney, Agent, or Firm* — Cantor Colburn LLP

(57) ABSTRACT

A system and method to perform two-stage beamforming in a radar system includes obtaining an incoming signal vector x associated with a detected target. The method also includes performing coarse beamforming with a first set of $k_1$ azimuthal angle $\theta_i$ and elevation angle $\varphi_i$ combinations associated with each element of the vector, and selecting a selected area in an azimuth-elevation plane around a subset of the $k_1$ azimuthal angle $\theta_i$ and elevation angle $\varphi_i$ combinations for each element of the vector. Fine beamforming is performed in the selected area with a second set of $k_2$ azimuthal angle $\theta_i$ and elevation angle $\varphi_i$ combinations associated with each element of the vector. The second set of $k_2$ azimuthal angle $\theta_i$ and elevation angle $\varphi_i$ combinations is more closely spaced in the azimuth-elevation plane than the first set of $k_1$ azimuthal angle $\theta_i$ and elevation angle $\varphi_i$ combinations.

16 Claims, 5 Drawing Sheets

(51) Int. Cl.
*G01S 15/89* (2006.01)
*H01Q 3/26* (2006.01)
*G01S 13/931* (2020.01)
*G01S 13/02* (2006.01)

(52) U.S. Cl.
CPC .............. *G01S 13/42* (2013.01); *G01S 13/72* (2013.01); *G01S 13/931* (2013.01); *G01S 15/8927* (2013.01); *H01Q 3/26* (2013.01); *G01S 13/723* (2013.01); *G01S 2013/0245* (2013.01); *G01S 2013/468* (2013.01); *G01S 2013/9375* (2013.01)

(58) Field of Classification Search
CPC ......... G01S 7/52095; G01S 2013/9375; G01S 13/723; G01S 2013/0245; G01S 2013/468; H01Q 3/26
USPC .......................................................... 342/81
See application file for complete search history.

(56) References Cited

OTHER PUBLICATIONS

Liu, Chuanliangzi "Development of Hardware-in-the-Loop Simulation System for Electric Power Steering Controller Testing", Master's report, Michigan Technological University, 2015, pp. 1-83.
Mantaras et al., "Development and validation of a three-dimensional kinematic model for the McPherson steering and suspension mechanisms", Mechanism and Machine Theory, 2004, pp. 603-619.

* cited by examiner

TWO-STAGE BEAMFORMING

INTRODUCTION

The subject invention relates to two-stage beamforming.

Radar systems are increasingly used for object detection and tracking. The radar system can include an array of transmitters to transmit energy and one or more receivers to receive reflections resulting from the transmitted energy. For example, the radar system can be a multi-input multi-output (MIMO) system that facilitates obtaining an enlarged virtual aperture. Radar systems can be included on a variety of platforms. For example, vehicle-based radar systems provide information for target identification and avoidance and even automated driving applications. Exemplary vehicles include automobiles, construction equipment, and farm equipment. Once reflections resulting from the radar transmissions are received, signal processing is performed on the reflections to detect targets (the sources of the reflections) and perform other functions such as target tracking and identification, for example. One of the signal processing techniques is beamforming or spatial filtering that facilitates determining the direction of arrival of a reflection and, thus, the angular position of the associated target relative to the radar system that detected it. To improve the spatial resolution of the radar system, the number and granularity of directions of arrival that are considered must be increased. Yet, such an increase would also increase the computational complexity. Accordingly, it is desirable to provide an accurate beamforming implementation without a corresponding increase in complexity.

SUMMARY

In one exemplary embodiment, a method of performing two-stage beamforming in a radar system includes obtaining an incoming signal vector x associated with a detected target. Each element of the vector is associated with a different antenna element that receives the incoming signal. Coarse beamforming is performed with a first set of $k_1$ azimuthal angle $\theta_i$ and elevation angle $\varphi_i$ combinations associated with each element of the vector, and a selected area is selected in an azimuth-elevation plane around a subset of the $k_1$ azimuthal angle $\theta_i$ and elevation angle $\varphi_i$ combinations for each element of the vector. The method also includes performing fine beamforming in the selected area with a second set of $k_2$ azimuthal angle $\theta_i$ and elevation angle $\varphi_i$ combinations associated with each element of the vector. The second set of $k_2$ azimuthal angle $\theta_i$ and elevation angle $\varphi_i$ combinations is more closely spaced in the azimuth-elevation plane than the first set of $k_1$ azimuthal angle $\theta_i$ and elevation angle $\varphi_i$ combinations. Azimuth and elevation angles are obtained from each antenna element to a direction of arrival of a target based on the fine beamforming.

In addition to one or more of the features described herein, an identified azimuthal angle $\theta_i$ and elevation angle $\varphi_i$ combination among the $k_1$ azimuthal angle $\theta_i$ and elevation angle $\varphi_i$ combinations are identified for each element of the vector as a coarse azimuth and elevation to the direction of arrival of the target based on the coarse beamforming.

In addition to one or more of the features described herein, selecting the selected area includes selecting the identified azimuthal angle $\theta_i$ and elevation angle $\varphi_i$ combination for each element of the vector as the subset of the $k_1$ azimuthal angle $\theta_i$ and elevation angle $\varphi_i$ combinations.

In addition to one or more of the features described herein, selecting the selected area includes selecting the identified azimuthal angle $\theta_i$ and elevation angle $\varphi_i$ combination and at least one other azimuthal angle $\theta_i$ and elevation angle $\varphi_i$ combination, among the $k_1$ azimuthal angle $\theta_i$ and elevation angle $\varphi_i$ combinations, that is adjacent to the identified azimuthal angle $\theta_i$ and elevation angle $\varphi_i$ combination for each element of the vector as the subset of the $k_1$ azimuthal angle $\theta_i$ and elevation angle $\varphi_i$ combinations.

In addition to one or more of the features described herein, the first set of $k_1$ azimuthal angle $\theta_i$ and elevation angle $\varphi_i$ combinations are determined based on a field of view of the radar system and a coarse resolution.

In another exemplary embodiment, a system to perform two-stage beamforming includes a plurality of antenna elements of a radar system, and a receive portion of the radar system to obtain an incoming signal vector x associated with a detected target. Each element of the vector is associated with a different one of the plurality of antenna elements of the radar system that receives the incoming signal. The system also includes a controller to perform coarse beamforming with a first set of $k_1$ azimuthal angle $\theta_i$ and elevation angle $\varphi_i$ combinations associated with each element of the vector, select a selected area in an azimuth-elevation plane around a subset of the $k_1$ azimuthal angle $\theta_i$ and elevation angle $\varphi_i$ combinations for each element of the vector, and perform fine beamforming in the selected area with a second set of $k_2$ azimuthal angle $\theta_i$ and elevation angle $\varphi_i$ combinations associated with each element of the vector. The second set of $k_2$ azimuthal angle $\theta_i$ and elevation angle $\varphi_i$ combinations is more closely spaced in the azimuth-elevation plane than the first set of $k_1$ azimuthal angle $\theta_i$ and elevation angle $\varphi_i$ combinations. The system obtains azimuth and elevation angles from each antenna element to a direction of arrival of a target based on the fine beamforming.

In addition to one or more of the features described herein, the controller identifies an identified azimuthal angle $\theta_i$ and elevation angle $\varphi_i$ combination among the $k_1$ azimuthal angle $\theta_i$ and elevation angle $\varphi_i$ combinations for each element of the vector as a coarse azimuth and elevation to the direction of arrival of the target based on the coarse beamforming.

In addition to one or more of the features described herein, the controller selects the selected area by selecting the identified azimuthal angle $\theta_i$ and elevation angle $\varphi_i$ combination for each element of the vector as the subset of the $k_1$ azimuthal angle $\theta_i$ and elevation angle $\varphi_i$ combinations.

In addition to one or more of the features described herein, the controller selects the selected area by selecting the identified azimuthal angle $\theta_i$ and elevation angle $\varphi_i$ combination and at least one other azimuthal angle $\theta_i$ and elevation angle $\varphi_i$ combination, among the $k_1$ azimuthal angle $\theta_i$ and elevation angle $\varphi_i$ combinations, that is adjacent to the identified azimuthal angle $\theta_i$ and elevation angle $\varphi_i$ combination for each element of the vector as the subset of the $k_1$ azimuthal angle $\theta_i$ and elevation angle $\varphi_i$ combinations.

In addition to one or more of the features described herein, the controller determines the first set of $k_1$ azimuthal angle $\theta_i$ and elevation angle $\varphi_i$ combinations based on a field of view of the radar system and a coarse resolution.

In addition to one or more of the features described herein, the system is housed in an automobile.

In another exemplary embodiment, a vehicle includes a radar system to obtain an incoming signal vector x associated with a detected target. Each element of the vector is associated with a different antenna element of the radar system that receives the incoming signal. A controller performs coarse beamforming with a first set of $k_1$ azimuthal angle $\theta_i$ and elevation angle $\varphi_i$ combinations associated with each element of the vector, selects a selected area in an azimuth-elevation plane around a subset of the $k_1$ azimuthal angle $\theta_i$ and elevation angle $\varphi_i$ combinations for each element of the vector, and performs fine beamforming in the selected area with a second set of $k_2$ azimuthal angle $\theta_i$ and elevation angle $\varphi_i$ combinations associated with each element of the vector. The second set of $k_2$ azimuthal angle $\theta_i$ and elevation angle $\varphi_i$ combinations is more closely spaced in the azimuth-elevation plane than the first set of $k_1$ azimuthal angle $\theta_i$ and elevation angle $\varphi_i$ combinations. The controller obtains azimuth and elevation angles from each antenna element to a direction of arrival of a target based on the fine beamforming.

In addition to one or more of the features described herein, the controller identifies an identified azimuthal angle $\theta_i$ and elevation angle $\varphi_i$ combination among the $k_1$ azimuthal angle $\theta_i$ and elevation angle $\varphi_i$ combinations for each element of the vector as a coarse azimuth and elevation to the direction of arrival of the target based on the coarse beamforming.

In addition to one or more of the features described herein, the controller selects the selected area by selecting the identified azimuthal angle $\theta_i$ and elevation angle $\varphi_i$ combination for each element of the vector as the subset of the $k_1$ azimuthal angle $\theta_i$ and elevation angle $\varphi_i$ combinations.

In addition to one or more of the features described herein, the controller selects the selected area by selecting the identified azimuthal angle $\theta_i$ and elevation angle $\varphi_i$ combination and at least one other azimuthal angle $\theta_i$ and elevation angle $\varphi_i$ combination, among the $k_1$ azimuthal angle $\theta_i$ and elevation angle $\varphi_i$ combinations, that is adjacent to the identified azimuthal angle $\theta_i$ and elevation angle $\varphi_i$ combination for each element of the vector as the subset of the $k_1$ azimuthal angle $\theta_i$ and elevation angle $\varphi_i$ combinations.

In addition to one or more of the features described herein, the controller determines the first set of $k_1$ azimuthal angle $\theta_i$ and elevation angle $\varphi_i$ combinations based on a field of view of the radar system and a coarse resolution.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
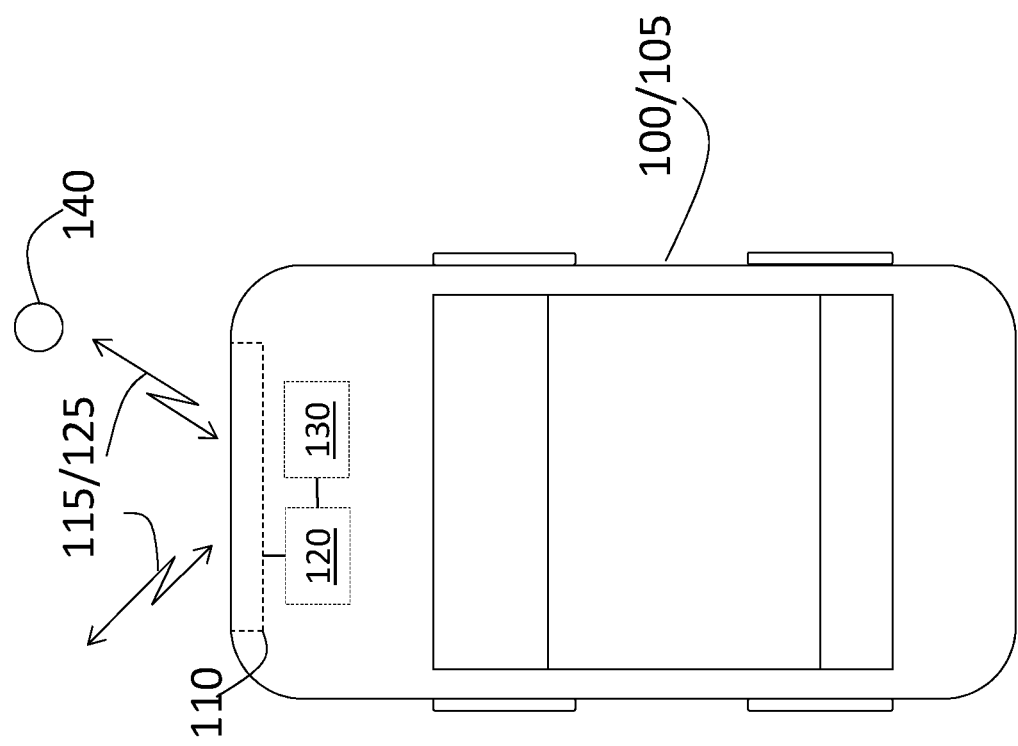
FIG. 1 is a block diagram of a target tracking system according to one or more embodiments.

The following description is merely exemplary in nature and is not intended to limit the present disclosure, its application or uses. It should be understood that throughout the drawings, corresponding reference numerals indicate like or corresponding parts and features.

As previously noted, beamforming is a signal processing technique. While beamforming can be used on the transmit side to control directionality of a transmission, the processing of reflections at the receiver portion is of interest according to one or more embodiments. The methods and systems detailed herein relate to one or more embodiments of determining the direction of arrival of radar reflections based on two-stage beamforming. The first stage is performed over a coarse grid or area, and the second stage is performed over a fine grid that is centered on the direction of arrival estimated in the first stage.

In accordance with an exemplary embodiment of the invention, FIG. 1 is a block diagram of a target tracking system. The exemplary platform 100 shown in FIG. 1 is an automobile 105. In alternate embodiments, the platform 100 can be any support such as another type of vehicle (e.g., construction equipment, farm equipment) or equipment in an automated manufacturing facility, for example. The target tracking system includes an antenna array 110 that receives reflections 125 from one or more targets 140. The same antenna array 110 or a different one can be used to send transmissions 115. A radar system 120 is coupled to the antenna array 110 and includes transmit and receive portions.

The radar system 120 can process the transmitted and received signals or can be coupled to a controller 130 that can additionally or alternately process the transmitted and received signals. The processing of the transmitted and received signals involves processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 130 can manage or communicate with systems that manage operations in the automobile 105 (e.g., target avoidance, automated operation) that use information from the radar system 120.

Figure 2:
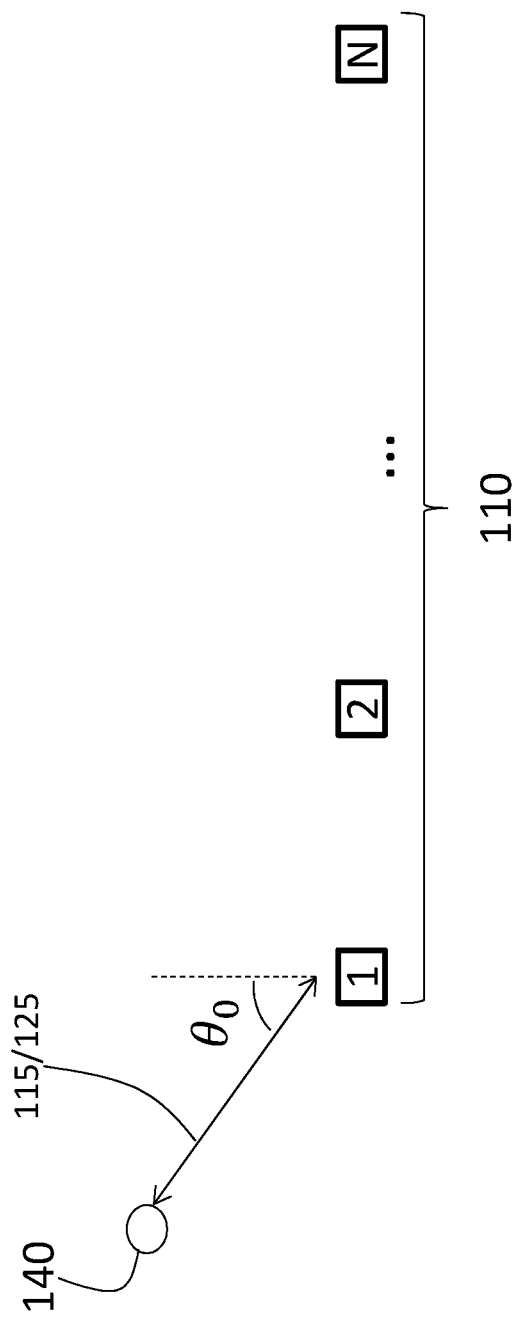
FIG. 2 details the antenna array used to perform the two-stage beamforming according to one or more embodiments.

FIG. 2 details the antenna array 110 used to perform the two-stage beamforming according to one or more embodiments. N elements are shown in the antenna array 110. A target 140 with an azimuthal angle $\theta_0$ to the direction of arrival (DOA) to antenna element 1 of the antenna array 110 is also shown. The azimuthal angle $\theta_0$ at a given elevation angle $\varphi_0$ to the DOA is discussed for explanatory purposes. The elevation angle $\varphi_0$ to the DOA is discussed with reference to FIGS. 4 and 5. The DOA and associated azimuthal angle $\theta_0$ of the same target 140 to each of the antenna elements 1 through N of the antenna array 110 will be slightly different. The response vector x or output for each element of the antenna array 110 is given by:

$$x = a(\theta_0) \cdot s + n \qquad \text{[EQ. 1]}$$

Thus, each entry of the vector x corresponds with one element of the antenna array 110 and the associated azimuthal $\theta_0$. In EQ. 1, $a(\theta_0)$ is the beamforming vector, s is the transmitted signal, and n is the noise vector. To estimate the azimuthal angle $\theta_0$, a steering vector $w(\theta)$ must be found that satisfies:

$$w = \frac{a(\theta)}{\|a(\theta)\|} \qquad \text{[EQ. 2]}$$

The steering vector w(θ) is a set of weights that maximizes the power collected from the angle θ. That is, the azimuthal angle $θ_0$ is the angle at which the maximum occurs:

$$θ_0 = \underset{θ}{\mathrm{argmax}} |w(θ)^H x|^2 \quad [\text{EQ. 3}]$$

In EQ. 3, the H indicates the Hermitian conjugate or conjugate transpose of the steering vector w(θ).

In order to determine the azimuthal angle $θ_0$, steering vectors w(θ) are collected for all azimuthal angles of interest θi (i=1, . . . , k) in a matrix W. Then, the angle that provides the maximal absolute value of the power vector p is found as the azimuthal angle $θ_0$ to the DOA. This power vector p is given by:

$$p = Wx = \begin{bmatrix} w(θ_1)^H \\ w(θ_2)^H \\ \cdot \\ \cdot \\ \cdot \\ w(θ_k)^H \end{bmatrix} x \quad [\text{EQ. 4}]$$

Again, the value of the azimuthal angle $θ_0$ associated with the DOA, which is the $θ_i$ that gives the maximal absolute value of the power vector p, will not be identical for each element of the antenna array 110, because the DOA associated with the same target 140 is not identical for each element of the antenna array 110. Thus, a different $θ_i$ value (different row) gives the maximal absolute value of p for each column of $w(θ_i)$.

Figure 3:
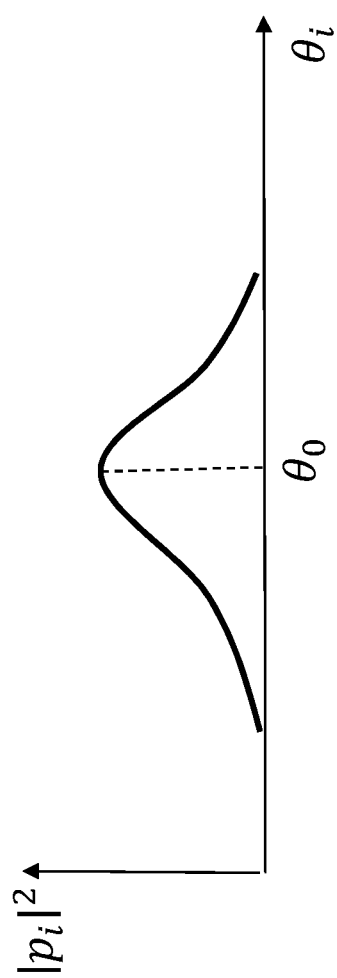
FIG. 3 shows an exemplary curve of the square of the maximal absolute value of p.

FIG. 3 shows an exemplary curve of the square of the maximal absolute value of p for a set of angles $θ_i$ and one exemplary element of the antenna array 110. FIG. 3 indicates the resulting azimuthal angle $θ_0$. As previously discussed, increasing the set of closely spaced angles of interest $θ_i$ for W facilitates obtaining the position of the target 140 with a higher level of accuracy (i.e., a higher degree of spatial resolution). However, increasing the size of matrix W would proportionally increase the computational complexity of searching for the maximal absolute value using EQ. 4. The beamforming process to obtain the value of azimuthal angle $θ_0$ itself is known.

According to one or more embodiments, a two-stage beamforming process is performed. The maximal absolute value of the power vector p is found in a first stage with a coarse set of $k_1$ values of $θ_i$. Then, in a second stage, the maximal absolute value of the power vector p is found with a finer set of $k_2$ values of $θ_i$. The second stage includes values of $θ_i$ that are centered around the DOA $θ_0$ estimated in the first stage.

Figure 4:
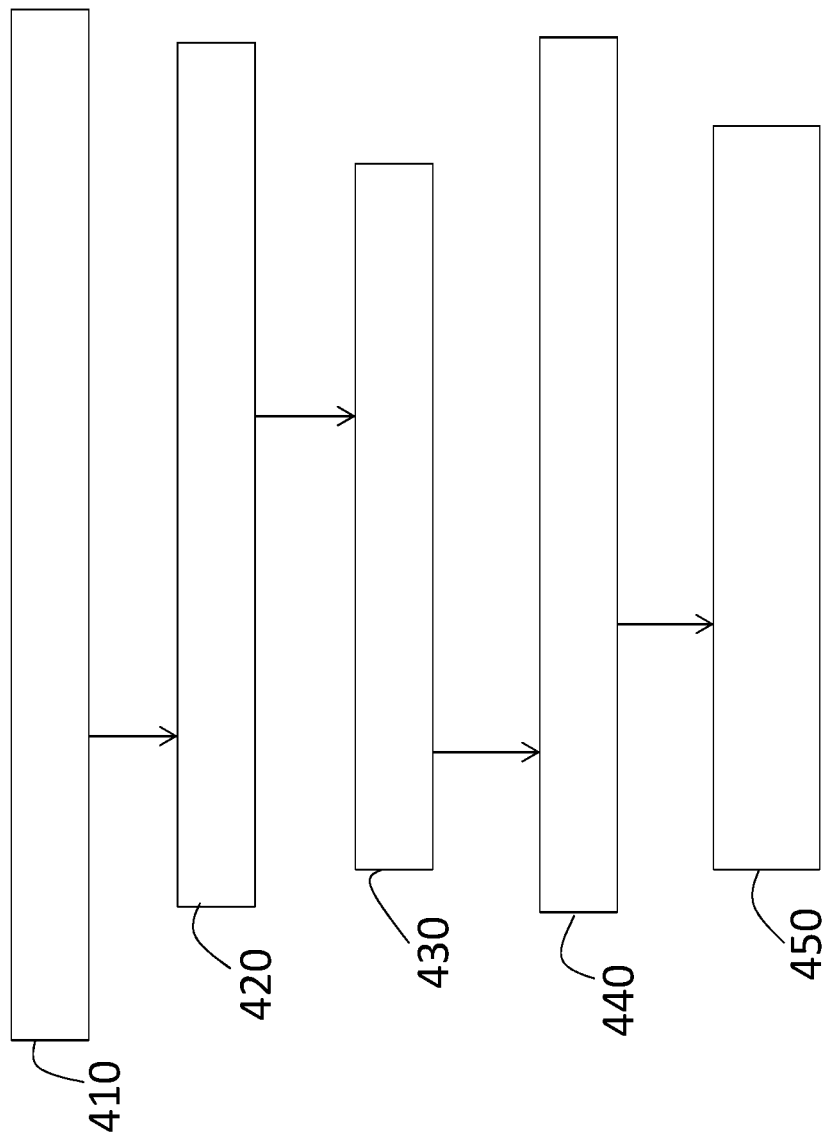
FIG. 4 is a process flow of a method of performing two-stage beamforming according to one or more embodiments.

FIG. 4 is a process flow of a method of performing two-stage beamforming according to one or more embodiments. Both azimuthal angle $θ_0$ and elevation angle $φ_0$ to the DOA are determined by considering different combinations of azimuthal angle $θ_i$ and elevation angle $φ_i$ in the steering matrix W according to two-stage beamforming. At block 410, obtaining the incoming signal vector x for a detected target includes having an entry in the vector corresponding to each element of the antenna array 110. Performing coarse beamforming at the first stage, at block 420, includes selecting a coarse steering matrix W (i.e., a coarse set of $k_1$ values of azimuthal angles $θ_i$ and elevation angles $φ_i$). The beamforming process itself involves determining the azimuthal angle $θ_i$ and elevation angle $φ_i$ combination among the coarse set of $k_1$ values of azimuthal angles $θ_i$ and elevation angles $φ_i$ that results in the maximal absolute value of the power vector p according to EQ. 4.

A sector associated with a given azimuth angle $θ_i$ and elevation angle $φ_i$ combination refers to the area in the azimuth/elevation plane that is closer to the given azimuth angle $θ_i$ and elevation angle $φ_i$ combination than any other azimuth angle $θ_i$ and elevation angle $φ_i$ combination. Choosing a subset of the coarse sectors, at block 430, refers to first choosing a subset of the coarse set of $k_1$ values of azimuthal angles $θ_i$ and elevation angles $φ_i$ and then determining the sectors associated with that subset of the coarse set of $k_1$ values of azimuthal angles $θ_i$ and elevation angles $φ_i$. The subset is chosen based on which azimuth angle $θ_i$ and elevation angle $φ_i$ combination, among the coarse set of $k_1$ values of azimuthal angles $θ_i$ and elevation angles $φ_i$, results in the maximal absolute value of the power vector p. The subset can be only the sector associated with the azimuth angle $θ_i$ and elevation angle $φ_i$ combination that results in the maximal absolute value of the power vector p according to an embodiment. As discussed with reference to FIG. 5, the subset of coarse sectors can include adjacent sectors, as well.

Performing fine beamforming at the second stage, at block 440, includes selecting a fine steering matrix W (i.e., a fine set of $k_2$ values of azimuthal angles $θ_i$ and elevation angles $φ_i$ within the subset of coarse sectors chosen at block 430 that are more closely spaced in the azimuth-elevation plane than the coarse set) and once again finding the azimuthal angle $θ_i$ and elevation angle $φ_i$ combination that results in the maximal absolute value of the power vector p according to EQ. 4. Obtaining the angles (azimuthal angle $θ_0$ and elevation angle $φ_0$) to the DOA for each element of the antenna array 110, at block 450, involves determining the combination, among the fine set of $k_2$ values of azimuthal angle $θ_i$ and elevation angle $φ_i$ combinations corresponding with the maximal absolute value of the power vector p determined using the fine steering matrix W according to EQ. 4.

In an exemplary case discussed with reference to FIG. 4, a single target is assumed in the azimuth-elevation plane per input signal vector x. The horizontal field of view (HFOV) is ±45 degrees and the vertical FOV (VFOV) is ±45 degrees for the radar system 120. The coarse resolution (coarse_res) is 5 degrees in both the azimuthal and elevation planes, and the fine resolution (fine_res) is 0.5 degrees in both the azimuthal and elevation planes. The number of antenna elements N in the antenna array 110 is 12 (N=12). Thus, each vector (p and w) has 12 entries. The steering matrix W used for the coarse beamforming in the first stage, at block 420, has $k_1$ elements (steering vectors w), where $$k_1^2 = HFOV * \frac{VFOV}{(\text{coarse\_res})^2} = (2*45) * \frac{(2*45)}{(5)^2} = 324 \quad [\text{EQ. 5}]$$

The steering matrix W used for fine beamforming in the second stage, at block 440, has $k_2$ elements (steering vectors w), where $$k_2^2 = \frac{(\text{coarse\_res})^2}{(\text{fine\_res})^2} = \frac{(5)^2}{(0.5)^2} = 100 \quad [\text{EQ. 6}]$$

As EQ. 5 and EQ. 6 indicate, a total ($k_1+k_2$) of 424 steering vectors w are used in the two-stage beam forming example discussed above. By contrast, k steering vectors w are used to achieve the same resolution according to the prior single-stage beamforming technique, where $$k^2 = HFOV * \frac{VFOV}{(\text{fine\_res})^2} = (2*45) * \frac{(2*45)}{(0.5)^2} = 32,400 \quad [\text{EQ. 7}]$$

As the example illustrates, the two-stage beamforming according to one or more embodiments facilitates obtaining the azimuthal angle $\theta_0$ and elevation angle $\varphi_0$ to the DOA with a number of steering vectors w (324) that is on the order of 100 times fewer by comparison.

Figure 5:
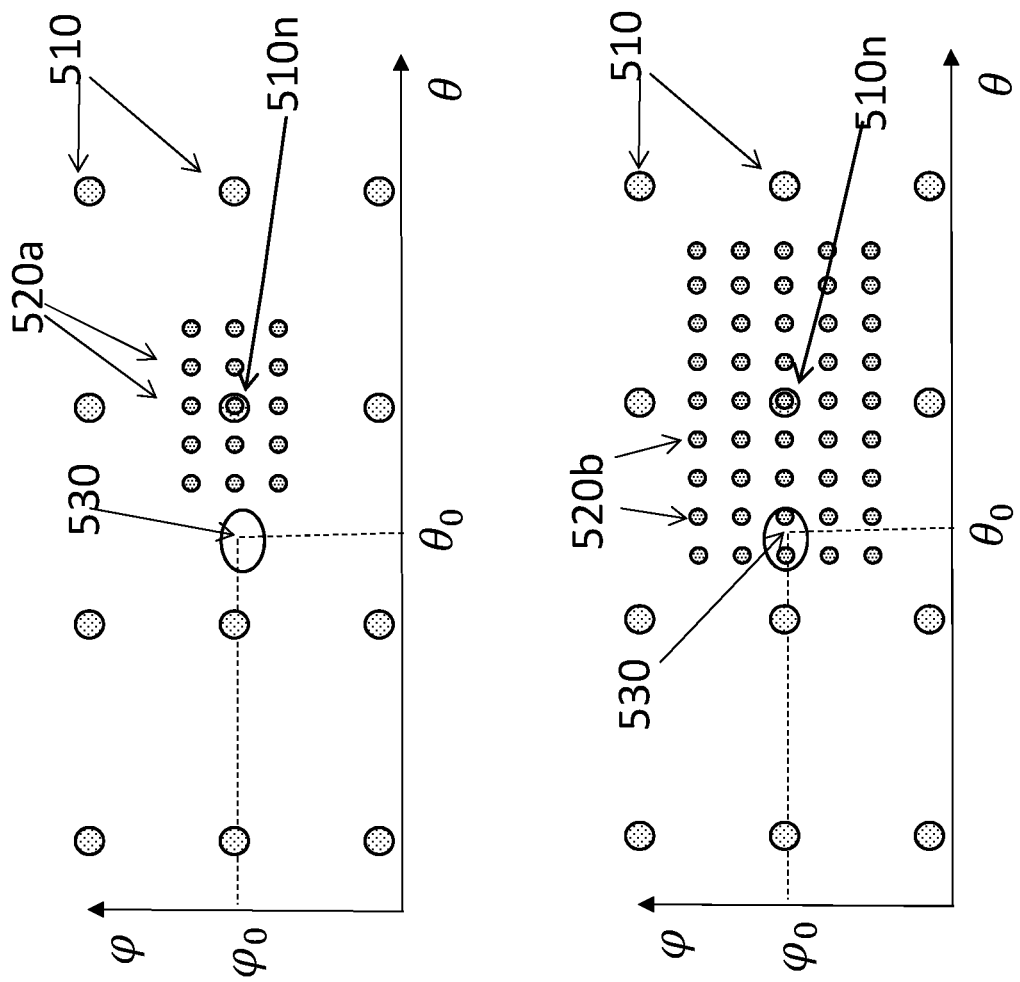
FIG. 5 shows exemplary fine grid points for a steering vector w according to two embodiments.

FIG. 5 shows exemplary fine grid points 520a for a steering vector w according to one embodiment and exemplary fine grid points 520b for a steering vector w according to another embodiment. The coarse grid points 510 (i.e., azimuth angle $\theta_i$ and elevation angle $\varphi_i$ combinations) for a steering vector w and the area 530 corresponding with the azimuthal angle $\theta_0$ and elevation angle $\varphi_0$ to the DOA are also shown. The coarse grid point 510n is identified as the sector or the subset of coarse grid points 510 of interest at block 430. As FIG. 5 indicates, according to the first embodiment, the fine grid points 520a are confined to only those in the sector of the coarse grid point 510n, where the sector is the area closer to the coarse grid point 510n than any other coarse grid point 510, as previously noted. In this case, the area 530 corresponding with the azimuthal angle $\theta_0$ and elevation angle $\varphi_0$ to the DOA is outside the area of the fine grid points 520a. According to an alternate embodiment, which is also shown in FIG. 5, the fine grid points 520b are not only in the sector of the coarse grid point 510n but also partially in the sectors of neighboring coarse grid points 510 to the coarse grid point 510n. As such, the fine grid points 520b cover the area 530 corresponding with the azimuthal angle $\theta_0$ and elevation angle $\varphi_0$ to the DOA.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the invention not be limited to the particular embodiments disclosed, but will include all embodiments falling within the scope of the application.

What is claimed is:

1. A method of performing two-stage beamforming in a radar system, the method comprising:
   obtaining an incoming signal vector x associated with a detected target, wherein each element of the vector is associated with a different antenna element that receives the incoming signal;
   performing coarse beamforming with a first set of $k_1$ azimuthal angle $\theta_i$ and elevation angle $\varphi_i$ combinations associated with each element of the vector;
   selecting a selected area in an azimuth-elevation plane around a subset of the $k_1$ azimuthal angle $\theta_i$ and elevation angle $\varphi_i$ combinations for each element of the vector;
   performing fine beamforming in the selected area with a second set of $k_2$ azimuthal angle $\theta_i$ and elevation angle $\varphi_i$ combinations associated with each element of the vector, wherein the second set of $k_2$ azimuthal angle $\theta_i$ and elevation angle $\varphi_i$ combinations is more closely spaced in the azimuth-elevation plane than the first set of $k_1$ azimuthal angle $\theta_i$ and elevation angle $\varphi_i$ combinations; and
   obtaining azimuth and elevation angles from each antenna element to a direction of arrival of a target based on the fine beamforming.

2. The method according to claim 1, further comprising identifying an identified azimuthal angle $\theta_i$ and elevation angle $\varphi_i$ combination among the $k_1$ azimuthal angle $\theta_i$ and elevation angle $\varphi_i$ combinations for each element of the vector as a coarse azimuth and elevation to the direction of arrival of the target based on the coarse beamforming.

3. The method according to claim 2, wherein the selecting the selected area includes selecting the identified azimuthal angle $\theta_i$ and elevation angle $\varphi_i$ combination for each element of the vector as the subset of the $k_1$ azimuthal angle $\theta_i$ and elevation angle $\varphi_i$ combinations.

4. The method according to claim 2, wherein the selecting the selected area includes selecting the identified azimuthal angle $\theta_i$ and elevation angle $\varphi_i$ combination and at least one other azimuthal angle $\theta_i$ and elevation angle $\varphi_i$ combination, among the $k_1$ azimuthal angle $\theta_i$ and elevation angle $\varphi_i$ combinations, that is adjacent to the identified azimuthal angle $\theta_i$ and elevation angle $\varphi_i$ combination for each element of the vector as the subset of the $k_1$ azimuthal angle $\theta_i$ and elevation angle $\varphi_i$ combinations.

5. The method according to claim 1, further comprising determining the first set of $k_1$ azimuthal angle $\theta_i$ and elevation angle $\varphi_i$ combinations is based on a field of view of the radar system and a coarse resolution.

6. A system to perform two-stage beamforming, the system comprising:
   a plurality of antenna elements of a radar system;
   a receive portion of the radar system configured to obtain an incoming signal vector x associated with a detected target, wherein each element of the vector is associated with a different one of the plurality of antenna elements of the radar system that receives the incoming signal; and
   a controller configured to perform coarse beamforming with a first set of $k_1$ azimuthal angle $\theta_i$ and elevation angle $\varphi_i$ combinations associated with each element of the vector, select a selected area in an azimuth-elevation plane around a subset of the $k_1$ azimuthal angle $\theta_i$ and elevation angle $\varphi_i$ combinations for each element of the vector, perform fine beamforming in the selected area with a second set of $k_2$ azimuthal angle $\theta_i$ and elevation angle $\varphi_i$ combinations associated with each element of the vector, wherein the second set of $k_2$ azimuthal angle $\theta_i$ and elevation angle $\varphi_i$ combinations is more closely spaced in the azimuth-elevation plane than the first set of $k_1$ azimuthal angle $\theta_i$ and elevation angle $\varphi_i$ combinations, and obtain azimuth and elevation angles from each antenna element to a direction of arrival of a target based on the fine beamforming.

7. The system according to claim 6, wherein the controller is further configured to identify an identified azimuthal angle $\theta_i$ and elevation angle $\varphi_i$ combination among the $k_1$ azimuthal angle $\theta_i$ and elevation angle $\varphi_i$ combinations for each element of the vector as a coarse azimuth and elevation to the direction of arrival of the target based on the coarse beamforming.

8. The system according to claim 7, wherein the controller is further configured to select the selected area by selecting the identified azimuthal angle $\theta_i$ and elevation angle $\varphi_i$ combination for each element of the vector as the subset of the $k_1$ azimuthal angle $\theta_i$ and elevation angle $\varphi_i$ combinations.

9. The system according to claim 7, wherein the controller is further configured to select the selected area by selecting the identified azimuthal angle $\theta_i$ and elevation angle $\varphi_i$ combination and at least one other azimuthal angle $\theta_i$, and elevation angle $\varphi_i$ combination, among the $k_1$ azimuthal angle $\theta_i$ and elevation angle $\varphi_i$ combinations, that is adjacent to the identified azimuthal angle $\theta_i$ and elevation angle $\varphi_i$ combination for each element of the vector as the subset of the $k_1$ azimuthal angle $\theta_i$ and elevation angle $\varphi_i$ combinations.

10. The system according to claim 6, wherein the controller is further configured to determine the first set of $k_1$ azimuthal angle $\theta_i$ and elevation angle $\varphi_i$ combinations based on a field of view of the radar system and a coarse resolution.

11. The system according to claim 6, wherein the system is housed in an automobile.

12. A vehicle, comprising:
a radar system configured to obtain an incoming signal vector x associated with a detected target, wherein each element of the vector is associated with a different antenna element of the radar system that receives the incoming signal; and
a controller configured to perform coarse beamforming with a first set of $k_1$ azimuthal angle $\theta_i$, and elevation angle $\varphi_i$ combinations associated with each element of the vector, select a selected area in an azimuth-elevation plane around a subset of the $k_1$ azimuthal angle $\theta_i$ and elevation angle $\varphi_i$ combinations for each element of the vector, perform fine beamforming in the selected area with a second set of $k_2$ azimuthal angle $\theta_i$ and elevation angle $\varphi_i$ combinations associated with each element of the vector, wherein the second set of $k_2$ azimuthal angle $\theta_i$ and elevation angle $\varphi_i$ combinations is more closely spaced in the azimuth-elevation plane than the first set of $k_1$ azimuthal angle $\theta_i$ and elevation angle $\varphi_i$ combinations, and obtain azimuth and elevation angles from each antenna element to a direction of arrival of a target based on the fine beamforming.

13. The vehicle according to claim 12, wherein the controller is further configured to identify an identified azimuthal angle $\theta_i$ and elevation angle $\varphi_i$ combination among the $k_1$ azimuthal angle $\theta_i$ and elevation angle $\varphi_i$ combinations for each element of the vector as a coarse azimuth and elevation to the direction of arrival of the target based on the coarse beamforming.

14. The vehicle according to claim 13, wherein the controller is further configured to select the selected area by selecting the identified azimuthal angle $\theta_i$ and elevation angle $\varphi_i$ combination for each element of the vector as the subset of the $k_1$ azimuthal angle $\theta_i$ and elevation angle $\varphi_i$ combinations.

15. The vehicle according to claim 13, wherein the controller is further configured to select the selected area by selecting the identified azimuthal angle $\theta_i$ and elevation angle $\varphi_i$ combination and at least one other azimuthal angle $\theta_i$ and elevation angle $\varphi_i$ combination, among the $k_1$ azimuthal angle $\theta_i$ and elevation angle $\varphi_i$ combinations, that is adjacent to the identified azimuthal angle $\theta_i$ and elevation angle $\varphi_i$ combination for each element of the vector as the subset of the $k_1$ azimuthal angle $\theta_i$ and elevation angle $\varphi_i$ combinations.

16. The vehicle according to claim 12, wherein the controller is further configured to determine the first set of $k_1$ azimuthal angle $\theta_i$ and elevation angle $\varphi_i$ combinations based on a field of view of the radar system and a coarse resolution.

* * * * *